United States Patent
Kuo et al.

(10) Patent No.: US 7,117,057 B1
(45) Date of Patent: Oct. 3, 2006

(54) YIELD PATROLLING SYSTEM

(75) Inventors: Woei-Chyi Kuo, Taipei (TW);
Mingchu King, Hsin-Chu (TW);
Shih-Tsung Liang, Hsinchu (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 0 days.

(21) Appl. No.: 10/238,708

(22) Filed: Sep. 10, 2002

(51) Int. Cl.
*G06F 19/00* (2006.01)

(52) U.S. Cl. ............. 700/108; 700/95; 700/109; 700/110; 700/111; 700/121

(58) Field of Classification Search ........... 700/108, 700/109, 110, 121, 95, 111; 438/14; 702/179, 702/180, 181, 182, 183
See application file for complete search history.

(56) References Cited

U.S. PATENT DOCUMENTS

| | | | |
|---|---|---|---|
| 5,862,054 A * | 1/1999 | Li | 700/121 |
| 5,923,553 A | 7/1999 | Yi | 364/468.17 |
| 5,956,251 A | 9/1999 | Atkinson et al. | 364/468.16 |
| 6,055,463 A * | 4/2000 | Cheong et al. | 700/121 |
| 6,131,052 A * | 10/2000 | Ban et al. | 700/121 |
| 6,304,791 B1 | 10/2001 | Kim | 700/121 |
| 6,408,220 B1 * | 6/2002 | Nulman | 700/121 |

OTHER PUBLICATIONS

David J. Sheskin et al., The Kruskal-Wallis One-Way Analysis of Variance by Ranks (Nonparametric Test Employed with Ordinal Data), Handbook of Parametric and Nonparametric Statistical Procedures, 2000, 2nd ed., p. 144, Chapman & Hall/CRCUSA.

* cited by examiner

Primary Examiner—Albert W. Paladini
Assistant Examiner—Charles Kasenge (57) ABSTRACT

A yield patrolling system, which monitors production yield of a manufacturing line, has at least one product measurement and test device. The product measurement and test device measures yield determining parameters of product at completion of process steps executed by equipment within the manufacturing line. The system further has a test database in communication with the product measurement and test device to receive and retain the measured yield determining parameters. A statistical calculator is in communication with the test database to receive the measured yield determining parameters. The statistical calculator then calculates from the measured yield determining parameters production yield statistics indicating an amount of the product being fabricated on the manufacturing line. A yield-warning device is in communication with the statistical calculator to receive the production yield statistics and to provide a yield warning alert to a responsible person indicating that the manufacturing line is not fabricating product with a sufficient yield. Further, a yield information interface receives a compilation of the production yield statistics for each process step from the statistical calculator.

51 Claims, 4 Drawing Sheets

| PROC | | | | | | | | |
|---|---|---|---|---|---|---|---|---|
| PROD | STAGE | RECIPE | LY_EQ | LY_EQ MEAN | LY_EQ STD.DEV | HY_EQ MEAN | HT_EQ HY_EQ | HY_EQ STD.DEV |
| | | | | | | | | |
| | | | | | | | | |
| | | | | | | | | |

| PROD | STAGE | RECIPE | W_STAT | W_P VALUE | F_STAT | F_P VALUE | KW_STAT | KW_P VALUE | SIGNIFICANCE |
|---|---|---|---|---|---|---|---|---|---|
| | | | | | | | | | |
| | | | | | | | | | |
| | | | | | | | | | |

STAT DATA STORE — 150

*FIG. 4*

YIELD PATROLLING SYSTEM

BACKGROUND OF THE INVENTION

1. Field of the Invention

This invention relates to measuring product parameters within a manufacturing line such as a semiconductor process line, detecting statistical deviations and faults of various processes within the manufacturing line, and notifying appropriate control personnel of the process variations and faults.

2. Description of Related Art

In manufacturing processes such as fabrication of integrated circuits on a substrate, numerous process steps are necessary to fabricate the product such as wafers containing many integrated circuit chips. In the processing of integrated circuits, the yield is sensitive to the performance of the equipment performing the processes. The yield is detected by measuring the electrical performance of the integrated circuits and examination of the substrate for defects.

Generally, the substrates are fabricated with test structures being placed in the "scribe-line" between each of the integrated circuit chips. The test structures are probed and subjected to appropriate electrical and environmental stress to verify that the performance of the wafer will meet the objectives of the design. Further the wafers are scanned to detect physical defects that indicate a failure in the fabrication of the integrated circuit upon the wafer. These process monitoring and inspection tests generally capture failures and deviations of process equipment. However, it is well known in the art that certain process variations are not detected with process monitoring and inspection described. Certain equipment problems appear only with particular specific product design parameters and then are only evident from examination of long term parametric testing.

U.S. Pat. No. 5,923,553 (Yi) describes a method for controlling a semiconductor manufacturing process by failure analysis feedback. The method compares a previous failure analysis result with current real-time process conditions. The method begins by establishing a monitoring data base with abnormal process condition data, the abnormal process condition data being obtained by a correlation between a yield for each manufactured lot and corresponding process conditions for semiconductor equipment when the yield is lowered or semiconductor equipment malfunctions have occurred. An equipment database is then established by obtaining real-time process conditions for on-line semiconductor equipment. The real-time process conditions for the on-line semiconductor equipment are compared with the abnormal process conditions of the monitoring database. The operation of the on-line semiconductor equipment is then stopped when differences between the real-time and abnormal process conditions fall below a predetermined level.

U.S. Pat. No. 5,956,251 (Atkinson, et al.) teaches a process of establishing valid statistical dimensional tolerance limits for designs of detail parts. The process enables accurate prediction of an economically acceptable degree of non-conformance of a large flexible end item assembly made from the detail parts. The end item assembly has a set of predetermined dimensional tolerances. The detail part tolerances are enlarged substantially compared to tolerances that would be necessary using an arithmetic "worst case" approach to remain within the end assembly tolerances while remaining within preestablished stress limits of the parts. A preferred assembly sequence for assembling the parts into the assembly is selected and validated. Locations, numbers and size of coordination features to be machined in the detail parts are selected, by which the parts are located relative to each other and fastened together to form the assembly. Individual part statistical dimensional tolerances are established as a fabrication requirement for the parts that enable the parts to be economically produced and assembled into assemblies that meet the predetermined assembly dimensional tolerances. The parts are produced to the individual statistical dimensional tolerances in a capable process, having a process capability index equal to at least 1.0, while holding the mean values of the statistically determined dimensions of the individual parts to within a predetermined percentage of the nominal dimension. The end item is assembled in accordance with the preferred assembly sequence by locating the parts relative to each other by reference to the coordination features as the primary determinator of assembly configuration.

U.S. Pat. No. 6,304,791 (Kim) describes a method for controlling semiconductor equipment interlocked with a host computer. The method allows prevention of an operator from accidentally operating a piece of equipment, which is in an interlocked state. A host computer automatically stores information on any interlocked piece of equipment, and rechecks that information before allowing any product to be introduced into a piece of equipment. Optimal process conditions for each process are registered in the host computer. The registered optimal process condition is compared with process data reported from each piece of equipment. If it is determined that the reported data are in the range of the optimal process conditions in view of the comparison, it is then determined whether or not the reported data also satisfy a specific rule registered in the host computer. If it is determined that the reported data satisfy the specific rule, the process continues. Otherwise, if it is determined that the reported data do not satisfy the specific rule, the equipment and a tracking module of the host computer are simultaneously interlocked and the interlocking is automatically saved in the host computer. The process is stopped until the process failure is solved.

U.S. Pat. No. 5,862,054 (Li) teaches a process monitoring system for real time statistical process control. The method monitors process parameters from multiple process machines to provide real time statistical process control (SPC). The particular implementation was derived from ion implantation of wafers, but has wide applicability where there are a number of process machines having a number of process parameters and close continuous sampling of data is required. The process parameters are collected on a single computer over a single RS 485 network, and each parameter is analyzed and displayed separately for each process and process machine. Statistical variables like capability ratio and process capability index are calculated and presented on the computer screen along with graphs of the various parameters for a particular process machine. Data is aged out of the computer to an archival database under the control of a manufacturing information system and connected to a company wide network.

SUMMARY OF THE INVENTION

An object of this invention is to provide a system for monitoring yield of a manufacturing line such as an integrated circuit fabrication line.

Another object of this invention is to provide a system for detecting variations in yield determining parameters measured subsequent to individual process steps of the manufacturing line.

Further, another object of this invention is to provide a system for informing a responsible person of variations of yield determining parameters indicating a deviation of process factors due to changes in the equipment performing the process.

Still further, another object of this invention is to provide a mechanism for analyzing the statistical significance of the yield determining parameters measured subsequent to the individual process steps of the manufacturing line.

To accomplish at least one of these and other objects, a system for the monitoring of production yield of a manufacturing line has at least one product measurement and test device. The product measurement and test device measures yield determining parameters of product at completion of process steps executed by equipment within the manufacturing line. The system further has a test database in communication with the product measurement and test device to receive and retain the measured yield determining parameters. A statistical calculator is in communication with the test database to receive the measured yield determining parameters. The statistical calculator then calculates from the measured yield determining parameters production yield statistics indicating an amount of the product being fabricated on the manufacturing line. A yield-warning device is in communication with the statistical calculator to receive the production yield statistics and to provide a yield warning alert to a responsible person indicating that the manufacturing line is not fabricating product with a sufficient yield. Further, a yield information interface receives a compilation of the production yield statistics for each process step from the statistical calculator.

The statistical calculator generates the production yield statistics by first determining if a grouping of the yield determining parameters has a normal statistical distribution by performing statistical evaluations such as a Shapiro-Wilk W test. If the grouping of the yield determining parameters has a normal statistical distribution, the statistical calculator then determines a normal mean and normal variance for the grouping of the yield determining parameters by performing analysis of variance upon the grouping of yield determining parameters. If the grouping of yield determining parameters do not have a normal distribution, determining a median for the grouping of the yield determining parameters by performing a Kruskal-Wallis analysis of ranks test.

The yield warning alert is an electronic message transmitted to a person responsible for repair of the manufacturing line such that the manufacturing line is fabricating product with sufficient yield. The yield warning alert has a listing of equipment employed in the manufacturing line not having sufficient yield, a listing of processes accomplished by the manufacturing line not having sufficient yield, a listing of stages of each process with the equipment employed for each process not having sufficient yield, and a listing of production yield statistics for each piece of equipment and each process of the manufacturing line not having sufficient yield.

The yield information interface is published on a web page within an intranet of the company owning the manufacturing line or on the Internet. The web page includes a listing of equipment employed in the manufacturing line, a listing of processes accomplished by the manufacturing line, a listing of stages of each process with the equipment employed for each process, and a listing of production yield statistics for each piece of equipment and each process of the manufacturing line.

DETAILED DESCRIPTION OF THE INVENTION

Figure 1:
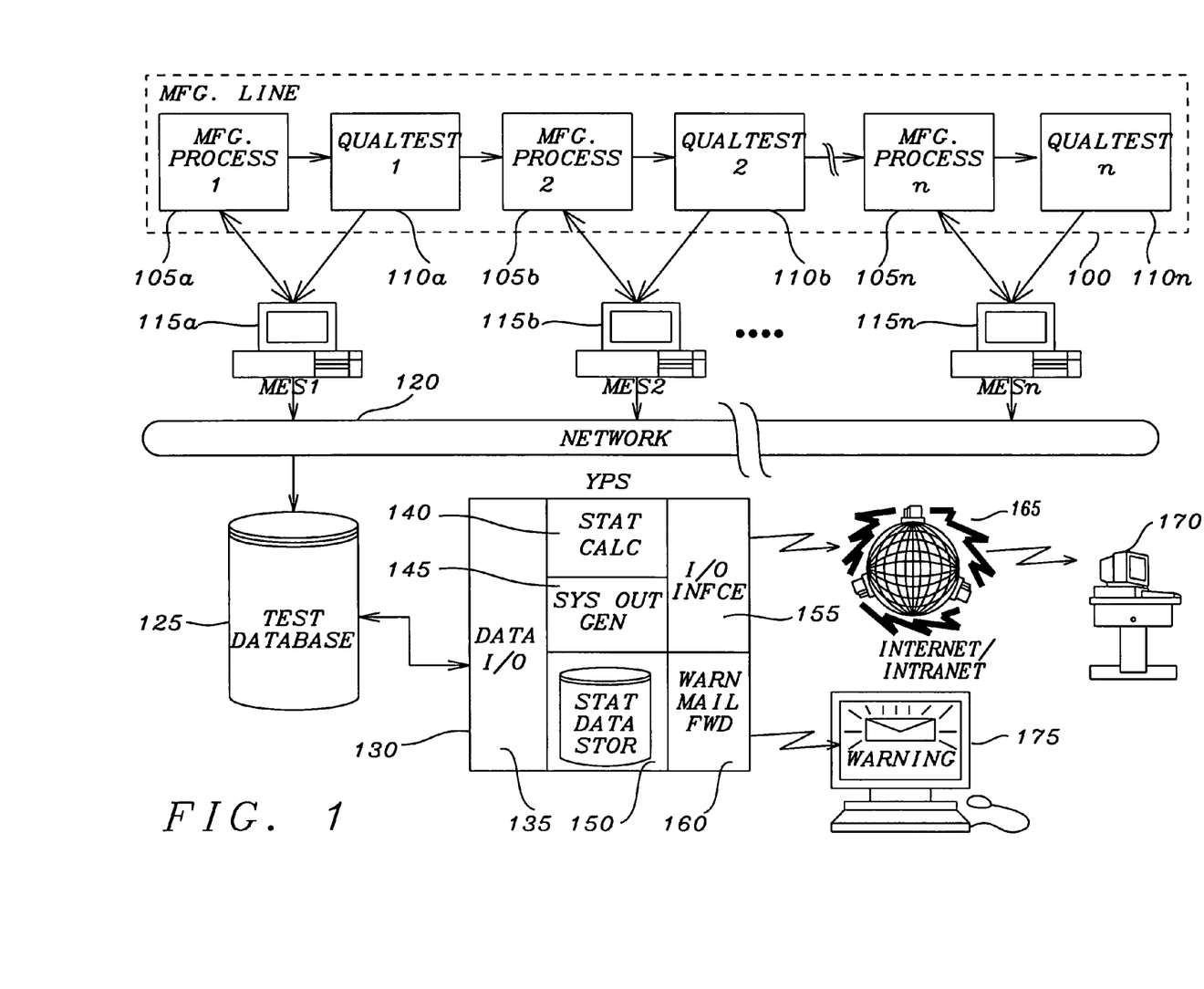
FIG. 1 is a system diagram of a manufacturing system having yield monitoring sub-system of this invention.

A manufacturing line 100, as shown in FIG. 1, has multiple manufacturing processes 105a, 105b, . . . , 105n performed serially. To accomplish the multiple manufacturing processes 105a, 105b, . . . , 105n, each manufacturing process 105a, 105b, . . . , 105n has various units of equipment to perform each step of a recipe for each manufacturing processes 105a, 105b, . . . , 105n. In present manufacturing lines 100, much of the equipment for the multiple manufacturing processes 105a, 105b, . . . , 105n is controlled by manufacturing execution control systems 115a, 115b, . . . , 115n. The manufacturing execution control systems 115a, 115b, . . . , 115n contain program instructions to allow control of the equipment and receive monitoring signals to determine the progress of the steps of the process through each piece of equipment employed in each of the multiple manufacturing processes 105a, 105b, . . . , 105n.

At the completion of each of the multiple manufacturing processes 105a, 105b, . . . , 105n, the product is transferred to quality tests stations 110a, 115b, . . . , 105n. Each of the quality test stations 110a, 110b, . . . , 110n has measurement and test equipment to inspect and test the product being fabricated for defects and for yield determining parameters. In an integrated circuit fabrication facility, a substrate is inspected to determine appropriate physical characteristics of the substrate following performance of the manufacturing process 105a, 105b, . . . , 105n. As described above, the substrate has test structures placed in the scribe line areas between each integrated circuit chip that are tested electrically with circuit probes to determine performance of the electrical components being fabricated upon the wafer. The inspection and test results for each wafer is transferred from the measurement and test equipment of the quality test stations 110a, 110b, . . . , 110n to the manufacturing execution control systems 115a, 115b, . . . , 115n. The manufacturing execution control systems 115a, 115b, . . . , 115n uses the information to determine the yield of the product being manufactured after each step of a particular manufacturing process 105a, 105b, . . . , 105n.

The manufacturing execution control systems 115a, 115b, . . . , 115n are able to either adjust the setting of the equipment to correct any obvious yield problems or provide an alert for malfunctioning equipment. However, there are certain yield determining functional parameters of the product that are not easily assessed by the measurement and test equipment of the quality test stations 110a, 110b, . . . , 110n and are found only after larger quantities of the product have been fabricated. For example an etching machine within an integrated circuit fabrication line may cause residue of the material being removed such as polycrystalline silicon. The residue initially has no effect on the normal parameter as measured during the processing, but causes failures ultimately in the product.

To determine the effects of the variations and/or interactions of the process equipment of the multiple manufacturing processes 105a, 105b, . . . , 105n in developing these functional parameters, multiple lots of the fabricated product must be evaluated statistically. To accomplish this, measurement data of the yield determining parameters from the measurement and test equipment of the quality test stations 110a, 110b, . . . , 110n is transferred from the manufacturing execution control systems 115a, 115b, . . . , 115n through the network 120 to the test database 125.

Figure 3:
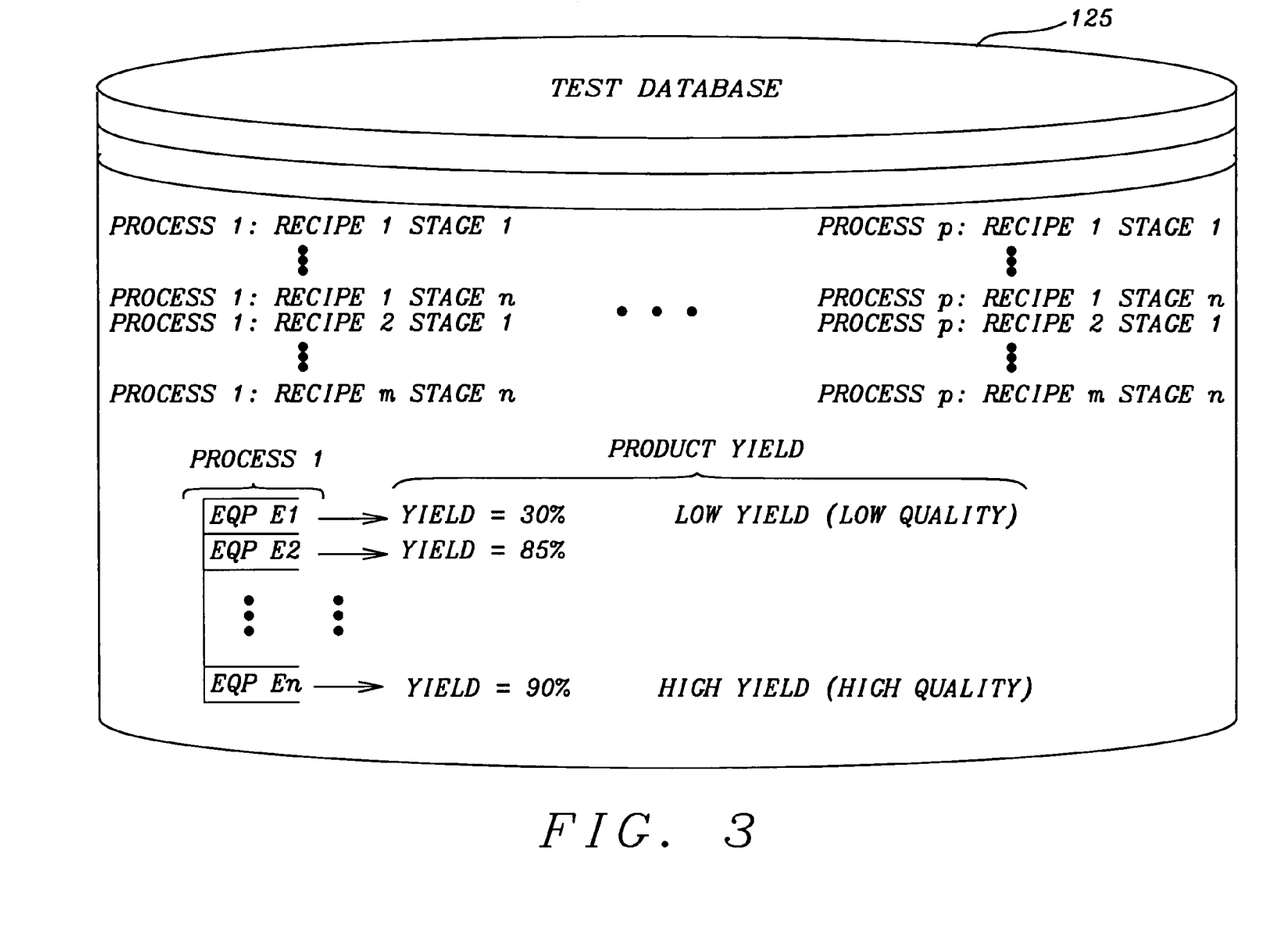
FIG. 3 is a diagram of the test database of the manufacturing system having yield monitoring sub-system of this invention.

The test database 125, as shown in FIG. 3, contains a listing of the manufacturing processes 105a, 105b, . . . , 105n with the recipe and stage identification for execution of each of the manufacturing processes 105a, 105b, . . . , 105n required for fabrication of product. The yield results from the measurement and test equipment is incorporated in the quality test stations 110a, 110b, . . . , 110n subsequent to operation of the equipment employed in each process is tabulated and retained within the test database 125.

The measurement data is extracted from the test database 125 by the yield patrolling system 130, which monitors the measurement data to determine the impact of variations of the equipment of the multiple manufacturing processes 105a, 105b, . . . , 105n upon the yield parameters. The yield patrolling system 130 performs statistical analysis upon the measurement data to detect abnormalities in the process that are detrimental to the yield that are normally detected by direct measurement.

The statistical results are formatted as a "web page" for publication on an intranet 165 of the firm owning the manufacturing line 100 or on the Internet for use by customers of the firm owning the manufacturing line. In the later case the customers are using the firm's manufacturing line 100 as a "virtual" manufacturing line in the possession of the customer. The customers personnel must be aware of the operation of the equipment of the multiple manufacturing processes 105a, 105b, . . . , 105n to insure proper operation of the manufacturing line 100. The personnel of the firm owning the manufacturing line 100 or the customer's personnel are able to access the web page from the Intranet or Internet 165 through a computer system 170 connected to the intranet or Internet 165.

The yield patrolling system 130 further monitors the production yield statistical results to determine if any of the equipment of the multiple manufacturing processes 105a, 105b, . . . , 105n have catastrophically deviated from determined limits, such that the yield of the manufacturing line 100 is deteriorating drastically. The yield patrolling system 130 generates a warning message that is transferred by electronic mail (email) 175 to a person within the firm responsible for correcting such deviations or to the person with the firm's customer's organization responsible for the fabrication of the product. The appropriate correction of the process and/or repair of the equipment can then be implemented.

The yield patrolling system 130 has a data input/output port 135 in communication with the test database 125 to extract the yield determining parametric measurement data. The measurement data is transferred from the data input/output port 135 to the statistical calculator 140 for execution of the statistical analysis. The statistical analysis begins by first determining if a grouping of the yield determining parametric measurement data has a normal statistical distribution by performing statistical evaluations such as a Shapiro-Wilk W test. If the grouping of the yield determining parametric measurement data has a normal statistical distribution, the statistical calculator then determines a normal mean and normal variance for the grouping of the yield determining parameters by performing analysis of variance upon the grouping of yield determining parametric measurement data. If the grouping of yield determining parametric measurement data does not have a normal distribution, determining a median for the grouping of the yield determining parameters by performing a Kruskal-Wallis analysis of ranks test. The results of the test for the normal statistical distribution, the mean, and variance or the grouping the yield determining parametric data are organized to make the set production yield statistics for each of the pieces of equipment of the multiple manufacturing processes 105a, 105b, 105n.

The production yield statistics are transferred from the statistical calculator 140 to the system output generator 145. The system output generator 140 compiles and formats the production yield statistics for publication as the "web page" and stores the formatted production yield statistics within the statistical data storage device unit 150.

The intranet/Internet input/output interface 155 is an internet information server and is connected to an internal communication network or a global communication network 165 to access an attached computer system 170. The intranet/Internet input/output interface 155 transfers the "web page" from the statistical data storage device 150 to the computer system 170 for display and review by the person responsible for the operation of the equipment of the manufacturing line 100.

The system output generator 145, further, compares the production yield statistics with a set of boundary conditions. If the production yield statistics exceed these boundary conditions, the system output generator 145 creates a warning message that is to be sent to a responsible person to inform the person that certain equipment within the manufacturing line 100 is not functioning properly and need repair or calibration. If the system output generator 145 creates the warning message, the warning message is retained within the statistical data storage device 150 and transferred to the warning message forwarding device 160. The warning message forwarding device 160 transfers the warning message as email 175 to alert the person responsible for maintenance of the equipment that the yield is deteriorating catastrophically and the equipment needs servicing. The preferred form of this warning message is, as stated above, electronic mail, however any other form of alert such as telephonic messaging, radio frequency or electronic messaging is in keeping with the intent of this invention.

Figure 4:
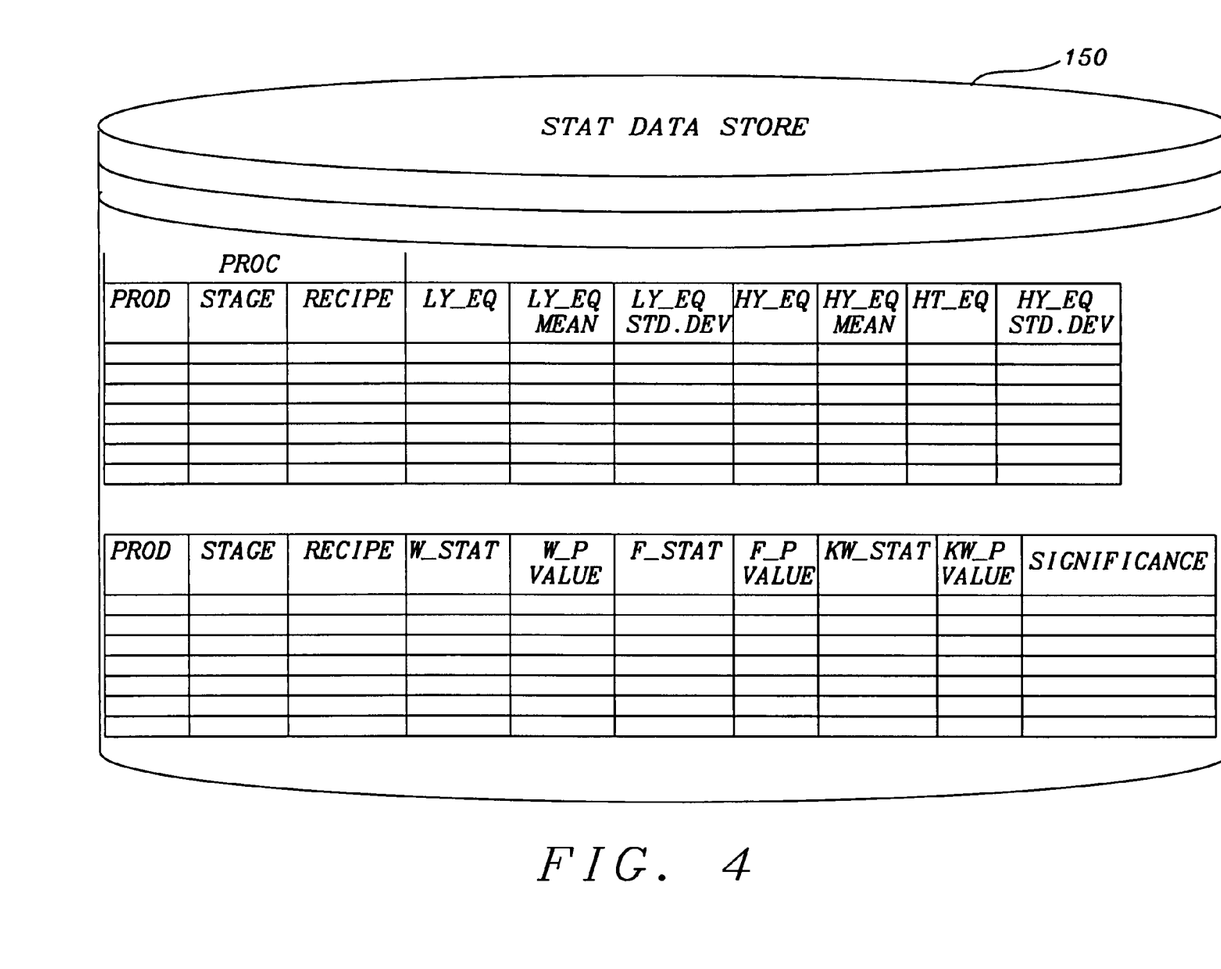
FIG. 4 is a diagram of the statistical data storage device of the manufacturing system having yield monitoring sub-system of this invention.

Referring to FIG. 4, the statistical data storage device lists the product stage and recipe for each process. The listing identifies the equipment of the process having the lowest yield (LY_EQ), the mean for the equipment of the process having the lowest yield (LY_EQ MEAN), and the standard deviation for the equipment of the process having the lowest yield (LY_EQ STD. DEV). The listing proceeds to list the equipment of the process having the highest yield (HY_EQ), the mean for the equipment of the process having the highest yield (HY_EQ MEAN), and the standard deviation for the equipment having the highest yield (HY_EQ STD. DEV). The listing then contains the W-statistic (W-STAT) for normality of the yield determining parametric data with the significance (W_P VALUE) of the W-statistic. The listing further contains the results of the F-test of the analysis of variance, if the distribution of the yield determining parametric data is a normal distribution. The F-test parameters include the F-statistic (F_STAT) and the significance (F_P VALUE) of the analysis of the results of the F-test. If the distribution is not normal, the Kruskal-Wallis analysis of variance by ranks is performed and the listing contains the Kruskal-Wallis statistic (KW_STAT) with its significance level (KW_P VALUE). The significance of the listing provides an indication that variation of the product of the manufacturing line is either within acceptable tolerances or is varying significantly.

The warning message is generally dependent upon the significance level significance level (KW_P VALUE) for each product stage and recipe of the process. Alternately, a warning message may be generated for an overall significance level of the process for a given product by the multiplication of the significance levels (KW_P VALUE) for each product stage or step of the recipe.

Further, the individual parametric tests of the processes of the fabrication line may not indicate deviations of the processing equipment. In order to detect these deviations, more sophisticated known data mining techniques are employed to detect these deviations.

Figure 2:
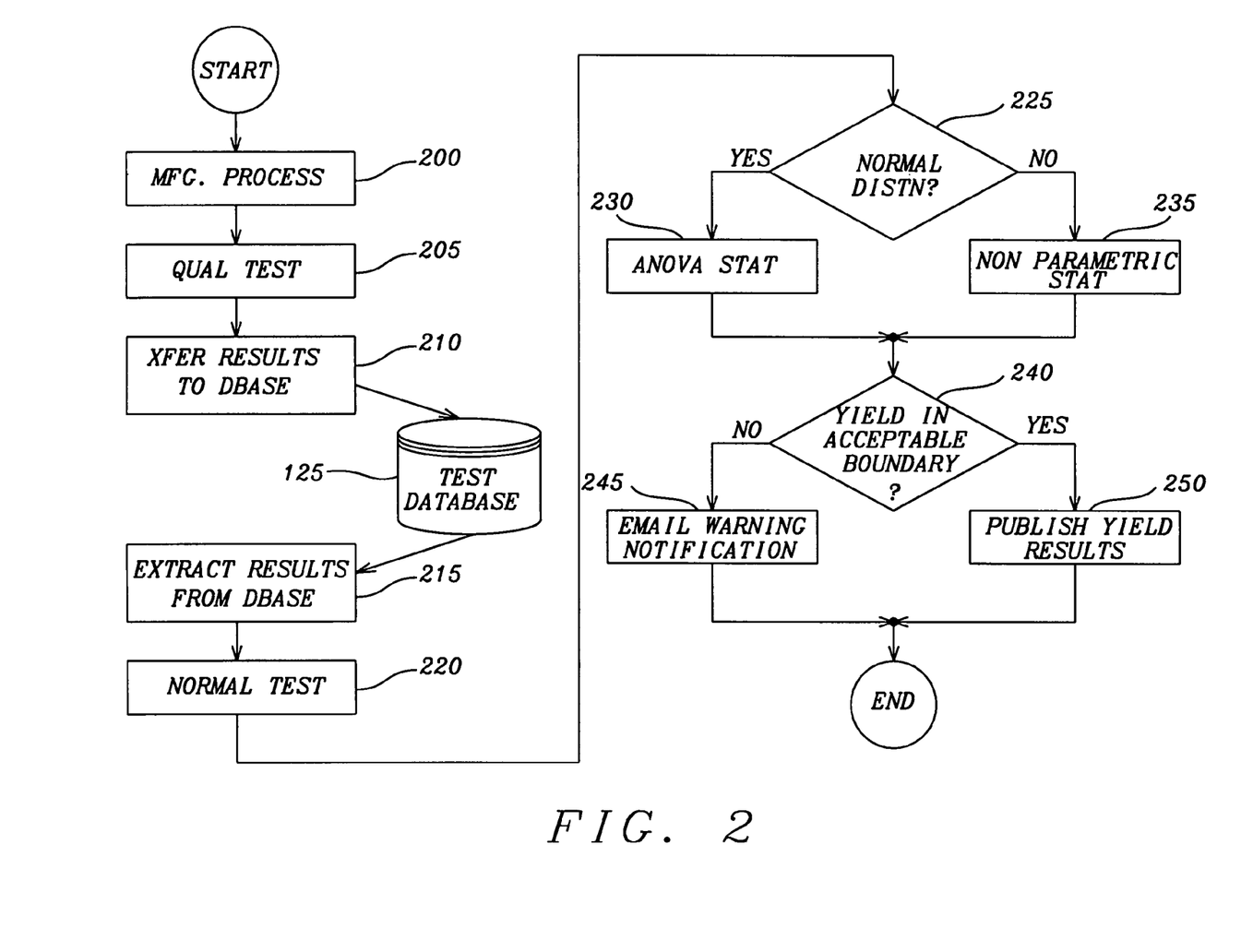
FIG. 2 is a process diagram of a method for monitoring yield of a manufacturing process line of this invention.

The yield patrolling system 130 of FIG. 1 is shown as a unique system, when in fact this system may be a program executing a method for monitoring yield of a manufacturing line. The program code is retained in media such as storage nodes of the cluster network of computer systems or a global communication network such as the Internet, or stored on storage media such as a read only memory (ROM), an electro-optical disk or a magnetic disk. Refer now to FIG. 2 for a description of the method for monitoring yield as executed by the program. The manufacturing execution system provides the controls and settings for the equipment of the manufacturing line to execute (Box 200) the recipe for the process necessary to fabricate the product. At completion of various steps in the process for fabricating the product, the product is inspected and tested (Box 205) to insure that the quality of the product is sufficient to guarantee an adequate yield. The results of the inspection and testing are then transferred (Box 210) to the test database 125.

The test database 125, as described above and shown in FIG. 3, contains a listing of the manufacturing processes with the recipe and stage identification for execution of each of the manufacturing processes required for fabrication of product. The measurements of yield determining parameters created by the measurement and test equipment is tabulated and retained within the test database 125.

The yield determining parameters are extracted (Box 215) from the test database 125 and tested (Box 220) for normality using such tests as the Shapiro-Wilk W test. The results are examined (Box 225) to determine normality of the yield determining parameters. If the yield determining parameters have a normal distribution, the grouping of yield determining parameters are subjected (Box 230) to an analysis of variance (ANOVA) to test the significance of the sample mean and variance. The test will employ such known tests as an F-test to determine the validity of the calculated sample mean and variance. If the distribution is not shown to be normal, the grouping of yield determining parameters is subjected to a nonparametric statistical analysis (Box 235). The nonparametric statistical analysis includes such analysis as the Kruskal-Wallis analysis of variance by ranks to determine if the nonparametric statistical model is valid.

Upon completion of the statistical analysis of the yield determining parameters, these statistical results are examined (Box 240) to determine if there are abnormal variations in the yields of the equipment of the processes of the manufacturing line. If there is an apparent abnormality, a warning alert is transferred (Box 245) to a responsible person. Generally, the alert is transferred as an email message, but it is in keeping with the intent of this invention that other methods of alert such as telephone communication, radio frequency and electronic messaging, or other alerting mechanism. If the statistics of the yield determining parameters is within the acceptable limits, the statistics of the yield determining parameters are published (Box 250) for review. Generally, the publication is through a "web page" placed on a server system with access to an intranet of the firm owning the manufacturing line or through the Internet for access by a person of a firm that is a customer of the firm owning the manufacturing line.

While certain statistical tests are described as the preferred methods for testing for normality and validity of the means and variances of the distributions, it is known in the art that other statistical tests may be used to insure the validity of the statistics. It is in keeping with the intent of this invention that any valid test for normality or for acceptability of the means and variances of the distributions of the yield determining parameters may be used as a substitute for the described statistical tests.

While this invention has been particularly shown and described with reference to the preferred embodiments thereof, it will be understood by those skilled in the art that various changes in form and details may be made without departing from the spirit and scope of the invention.

The invention claimed is:

1. A system for the monitoring of production yield of a manufacturing line comprising:
    at least one product measurement and test device for measuring yield determining parameters of product fabricated on said manufacturing line at completion of process steps executed within said manufacturing line;
    a test database in communication with said product measurement and test device to receive and retain said measured yield determining parameters;
    a statistical calculator in communication with said test database to receive said measured yield determining parameters and calculating from said measured yield determining parameters yield production statistics indicating an amount of said product being fabricated on said manufacturing line;
    a yield warning device in communication with said statistical calculator to receive said production yield statistics and to provide a yield warning alert indication that said manufacturing line is not fabricating product with a sufficient yield; and
    a yield information interface in communication with said statistical calculator to provide a compilation of said production yield statistics for each process step, wherein the statistical calculator executes the steps of:
    determining if a grouping of said yield determining parameters have a normal statistical distribution;
    if said grouping of the yield determining parameters have a normal statistical distribution, determining a normal mean and normal variance for said grouping of the yield determining parameters; and
    if said grouping of yield-determining parameters do not have a normal distribution determining a median for said grouping of the yield determining parameters.

2. The system of claim 1 wherein said manufacturing line is a semiconductor fabrication line for the fabrication of integrated circuits upon a substrate.

3. The system of claim 2 wherein yield-determining parameters are generated by measuring performance of electronic devices fabricated within test structures of said integrated circuits.

4. The system of claim 1 wherein determining if said grouping of yield determining parameters have a normal statistical distribution includes the step of performing a Shapiro-Wilk W test.

5. The system of claim 1 wherein determining said normal mean and normal variance includes the step of performing analysis of variance upon said grouping of yield determining parameters.

6. The system of claim 1 wherein determining said median includes the step of performing a Kruskal-Wallis analysis of ranks test.

7. The system of claim 1 wherein said yield warning alert is an electronic message transmitted to a person responsible for repair of said manufacturing line such that said manufacturing line is fabricating product with sufficient yield.

8. The system of claim 1 wherein said yield warning alert comprises
a listing of equipment employed in said manufacturing line not having sufficient yield;
a listing of processes accomplished by said manufacturing line not having sufficient yield;
a listing of stages of each process with said equipment employed for each process not having sufficient yield; and
a listing of production yield statistics for each piece of equipment and each process of said manufacturing line not having sufficient yield.

9. The system of claim 1 wherein said yield information interface comprises a web page.

10. The system of claim 9 wherein said web page includes:
a listing of equipment employed in said manufacturing line,
a listing of processes accomplished by said manufacturing line,
a listing of stages of each process with said equipment employed for each process, and
a listing of production yield statistics for each piece of equipment and each process of said manufacturing line.

11. A method for the monitoring of production yield of a manufacturing line comprising the steps of:
measuring yield determining parameters of a product fabricated on said manufacturing line at completion of process steps executed within said manufacturing line;
retaining within a test database said measured yield determining parameters;
calculating from said measured yield determining parameters, production yield statistics indicating an amount of said product being fabricated on said manufacturing line;
providing a yield warning alert indication that said manufacturing line is not fabricating product with a sufficient yield; and
providing a compilation of said production yield statistics for each process step, wherein calculating production yield statistics executes the steps of:
determining if a grouping of said yield determining parameters have a normal statistical distribution;
if said grouping of the yield determining parameters have a normal statistical distribution, determining a mean and variance for said grouping of the yield determining parameters: and
if said grouping of yield-determining parameters do not have a normal distribution determining a median for said grouping of the yield determining parameters.

12. The method of claim 11 wherein said manufacturing line is a semiconductor fabrication line for the fabrication of integrated circuits upon a substrate.

13. The method of claim 12 wherein yield-determining parameters are generated by measuring performance of electronic devices fabricated within test structures of said integrated circuits.

14. The method of claim 11 wherein determining if said grouping of yield determining parameters have a normal statistical distribution includes the step of performing a Shapiro-Wilk W test.

15. The method of claim 11 wherein determining said mean and variance includes the step of performing analysis of variance upon said grouping of yield determining parameters.

16. The method of claim 11 wherein determining said median includes the step of performing a Kruskal-Wallis analysis of ranks test.

17. The method of claim 11 wherein said yield warning alert is an electronic message transmitted to a person responsible for repair of said manufacturing line such that said manufacturing line is fabricating product with sufficient yield.

18. The method of claim 11 wherein providing said yield warning alert comprises the steps of:
providing a listing of equipment employed in said manufacturing line not having sufficient yield;
providing a listing of processes accomplished by said manufacturing line not having sufficient yield;
providing a listing of stages of each process with said equipment employed for each process not having sufficient yield; and
providing a listing of production yield statistics for each piece of equipment and each process of said manufacturing line not having sufficient yield.

19. The method of claim 11 wherein providing said yield information interface comprises the step of creating a web page.

20. The method of claim 19 wherein said web page includes:
creating a listing of equipment employed in said manufacturing line,
creating a listing of processes accomplished by said manufacturing line,
creating a listing of stages of each process with said equipment employed for each process, and
creating a listing of production yield statistics for each piece of equipment and each process of said manufacturing line.

21. An apparatus for the monitoring of production yield of a manufacturing line comprising:
means for measuring yield determining parameters of a product fabricated on said manufacturing line at completion of process steps executed within said manufacturing line;
means for retaining within a test database said measured yield determining parameters;
means for calculating from said measured yield determining parameters, production yield statistics indicating an amount of said product being fabricated on said manufacturing line;
means for providing a yield warning alert indication that said manufacturing line is not fabricating product with a sufficient yield; and means for providing a compilation of said production yield statistics for each process step, wherein the means for calculating production yield statistics comprises: the means for calculating production yield statistics comprises:

means for determining if a grouping of said yield determining parameters have a normal statistical distribution;

means for determining a mean and variance for said grouping of the yield determining parameters, if said grouping of the yield determining parameters have a normal statistical distribution; and means for determining a median for said grouping of the yield determining parameters, if said grouping of yield-determining parameters do not have a normal distribution.

22. The apparatus of claim 21 wherein said manufacturing line is a semiconductor fabrication line for the fabrication of integrated circuits upon a substrate.

23. The apparatus of claim 22 wherein yield-determining parameters are generated by measuring performance of electronic devices fabricated within test structures of said integrated circuits.

24. The apparatus of claim 21 wherein means for determining if said grouping of yield determining parameters have a normal statistical distribution includes means for performing a Shapiro-Wilk W test.

25. The apparatus of claim 21 wherein determining said mean and variance includes means for performing analysis of variance upon said grouping of yield determining parameters.

26. The apparatus of claim 21 wherein determining said median includes means for Kruskal-Wallis analysis of ranks test.

27. The apparatus of claim 21 wherein said yield warning alert is an electronic message transmitted to a person responsible for repair of said manufacturing line such that said manufacturing line is fabricating product with sufficient yield.

28. The apparatus of claim 21 wherein means for providing said yield warning alert comprises:

means for providing a listing of equipment employed in said manufacturing line not having sufficient yield;

means for providing a listing of processes accomplished by said manufacturing line not having sufficient yield;

means for providing a listing of stages of each process with said equipment employed for each process not having sufficient yield; and means for providing a listing of production yield statistics for each piece of equipment and each process of said manufacturing line not having sufficient yield.

29. The apparatus of claim 21 wherein means for providing said yield information interface comprises means for creating a web page.

30. The apparatus of claim 29 wherein said means for creating said web page includes:

means for creating a listing of equipment employed in said manufacturing line, means for creating a listing of processes accomplished by said manufacturing line, means for creating a listing of stages of each process with said equipment employed for each process, and means for creating a listing of production yield statistics for each piece of equipment and each process of said manufacturing line.

31. A computing system in communication with a manufacturing line for the monitoring of production yield of said manufacturing line comprising:

at least one data collection device in communication with a product measurement and test device, said product measurement and test device measuring yield determining parameters of product fabricated on said manufacturing line at completion of process steps executed within said manufacturing line;

a test database in communication with each of said data collection devices to receive and retain said measured yield determining parameters;

a statistical calculator in communication with said test database to receive said measured yield determining parameters and calculating from said measured yield determining parameters production yield statistics indicating an amount of said product being fabricated on said manufacturing line;

a yield warning device in communication with said statistical calculator to receive said production yield statistics and to provide a yield warning alert indication that said manufacturing line is not fabricating product with a sufficient yield; and a yield information interface in communication with said statistical calculator to provide a compilation of said production yield statistics for each process step, wherein the statistical calculator executes the steps of:

determining if a grouping of said yield determining parameters have a normal statistical distribution:

if said grouping of the yield determining parameters have a normal statistical distribution, determining a mean and variance for said grouping of the yield detemmining parameters; and if said grouping of yield-determining parameters do not have a normal distribution determining a median for said grouping of the yield determining parameters.

32. The computing system of claim 31 wherein said manufacturing line is a semiconductor fabrication line for the fabrication of integrated circuits upon a substrate.

33. The computing system of claim 32 wherein yield determining parameters are generated by measuring performance of electronic devices fabricated within test structures of said integrated circuits.

34. The computing system of claim 3 wherein determining if said grouping of yield determining parameters have a normal statistical distribution includes the step of performing a Shapiro-Wilk W test.

35. The computing system of claim 31 wherein determining said mean and variance includes the step of performing analysis of variance upon said grouping of yield determining parameters.

36. The computing system of claim 31 wherein determining said median includes the step of performing a Kruskal-Wallis analysis of ranks test.

37. The computing system of claim 31 wherein said yield warning alert is an electronic message transmitted to a person responsible for repair of said manufacturing line such that said manufacturing line is fabricating product with sufficient yield.

38. The computing system of claim 31 wherein said yield warning alert comprises a listing of equipment employed in said manufacturing line not having sufficient yield;

a listing of processes accomplished by said manufacturing line not having sufficient yield;

a listing of stages of each process with said equipment employed for each process not having sufficient yield; and a listing of production yield statistics for each piece of equipment and each process of said manufacturing line not having sufficient yield.

39. The computing system of claim 31 wherein said yield information interface comprises a web page.

40. The computing system of claim 39 wherein said web page includes:

a listing of equipment employed in said manufacturing line, a listing of processes accomplished by said manufacturing line, a listing of stages of each process with said equipment employed for each process, and a listing of production yield statistics for each piece of equipment and each process of said manufacturing line.

41. A medium for retaining a computer program which, when executed on a computing system, executes a process for the monitoring of production yield of a manufacturing line said process comprising the steps of:

measuring yield determining parameters of a product fabricated on said manufacturing line at completion of process steps executed within said manufacturing line;

retaining within a test database said measured yield determining parameters;

calculating from said measured yield determining parameters, production yield statistics indicating an amount of said product being fabricated on said manufacturing line;

providing a yield warning alert indication that said manufacturing line is not fabricating product with a sufficient yield; and providing a compilation of said production yield statistics for each process step, wherein calculating production yield statistics includes the steps of:

determining if a grouping of said yield determining parameters have a normal statistical distribution;

if said grouping of the yield determining parameters have a normal statistical distribution, determining a mean and variance for said grouping of the yield determining parameters; and if said grouping of yield-determining parameters do not have a normal distribution determining a median for said grouping of the yield determining parameters.

42. The medium for retaining a computer program of claim 41 wherein said manufacturing line is a semiconductor fabrication line for the fabrication of integrated circuits upon a substrate.

43. The medium for retaining a computer program of claim 42 wherein yield determining parameters are generated my measuring performance of electronic devices fabricated within test structures of said integrated circuits.

44. The medium for retaining a computer program of claim 41 wherein determining if said grouping of yield determining parameters have a normal statistical distribution includes the step of performing a Shapiro-Wilk W test.

45. The medium for retaining a computer program of claim 41 wherein determining said mean and variance includes the step of performing analysis of variance upon said grouping of yield determining parameters.

46. The medium for retaining a computer program of claim 41 wherein determining said median includes the step of performing a Kruskal-Wallis analysis of ranks test.

47. The medium for retaining a computer program of claim 41 wherein said yield warning alert is an electronic message transmitted to a person responsible for repair of said manufacturing line such that said manufacturing line is fabricating product with sufficient yield.

48. The medium for retaining a computer program of claim 41 wherein providing said yield warning alert comprises the steps of:

providing a listing of equipment employed in said manufacturing line not having sufficient yield;

providing a listing of processes accomplished by said manufacturing line not having sufficient yield;

providing a listing of stages of each process with said equipment employed for each process not having sufficient yield; and providing a listing of production yield statistics for each piece of equipment and each process of said manufacturing line not having sufficient yield.

49. The medium for retaining a computer program of claim 41 wherein providing said yield information interface comprises the step of creating a web page.

50. The medium for retaining a computer program of claim 49 wherein said web page includes:

creating a listing of equipment employed in said manufacturing line, creating a listing of processes accomplished by said manufacturing line, creating a listing of stages of each process with said equipment employed for each process, and creating a listing of production yield statistics for each piece of equipment and each process of said manufacturing line.

51. The medium for retaining a computer program of claim 41 wherein said medium is selected from the group of media consisting of storage nodes of a cluster network of computer systems or a global communication network such as the Internet, a read only memory (ROM), an electro-optical disk or a magnetic disk.

* * * * *